United States Patent
Miyachi

(10) Patent No.: US 7,570,647 B2
(45) Date of Patent: Aug. 4, 2009

(54) LAN TYPE INTERNET ACCESS NETWORK AND SUBSCRIBER LINE ACCOMMODATION METHOD FOR USE IN THE SAME NETWORK

(75) Inventor: Toshio Miyachi, Tokyo (JP)

(73) Assignee: NEC Corporation, Tokyo (JP)

( * ) Notice: Subject to any disclaimer, the term of this patent is extended or adjusted under 35 U.S.C. 154(b) by 930 days.

(21) Appl. No.: 10/352,644

(22) Filed: Jan. 29, 2003

(65) Prior Publication Data

US 2003/0142684 A1    Jul. 31, 2003

(30) Foreign Application Priority Data

Jan. 30, 2002    (JP)    .............. 2002-020839

(51) Int. Cl.
H04L 12/56    (2006.01)
(52) U.S. Cl. .................. 370/395.32; 370/395.54
(58) Field of Classification Search .......... 370/312, 370/432, 395.54, 401, 392, 389, 390, 471, 370/270
See application file for complete search history.

(56) References Cited

U.S. PATENT DOCUMENTS

| | | | | |
|---|---|---|---|---|
| 5,790,548 A | * | 8/1998 | Sistanizadeh et al. | 370/401 |
| 6,047,325 A | * | 4/2000 | Jain et al. | 709/227 |
| 6,167,052 A | * | 12/2000 | McNeill et al. | 370/399 |
| 6,697,360 B1 | * | 2/2004 | Gai et al. | 370/389 |
| 7,016,336 B2 | * | 3/2006 | Sorensen | 370/351 |
| 2002/0073338 A1 | * | 6/2002 | Burrows et al. | 713/201 |

FOREIGN PATENT DOCUMENTS

| | | |
|---|---|---|
| JP | 10-154998 | 6/1998 |
| JP | 2000-312211 | 11/2000 |
| JP | 2001-111592 | 4/2001 |
| JP | 2001-217875 | 8/2001 |

OTHER PUBLICATIONS

Japanese Office Action dated Aug. 28, 2007 along with a partial English Translation.
Munechika Nishida, Broadband will be much faster by reviewing setting and machine: Broadband Fastest Theory, ASAHI Personal Computer No. 294, Japan, The Asahi Shimbun Company, Sep. 1, 2001, No. 294, 32-45.
D. Senie, Changing the Default for Directed Broadcasts in Routers, RFC 2644 (Request for Comments: 2644), Network Working Group, Aug. 1999, URL: ftp://ftp.rfc-editor.org/in-notes/rfc2644.txt.

* cited by examiner

Primary Examiner—Hassan Kizou
Assistant Examiner—Bo Hui A. Zhu
(74) Attorney, Agent, or Firm—McGinn IP Law Group, PLLC

(57) ABSTRACT

L2 switch 1 accommodates a plurality of subscriber lines and is connected to an upper side of an internet including service/management device 5 to exchange data packet. L2 switch 1 transmits broadcast packet of DHCP and ARP among the exchanged data packets to not the side of subscriber line but the upper side of the internet. When L2 packet transfer device 2 transfers the broadcast packet of ARP request to IP address managing device 3, L2 packet transfer device 2 determines whether the ARP request is transmitted from a user terminal connected to the subscriber line or from service/management device 5 or packet transfer device 4.

20 Claims, 8 Drawing Sheets

LAN TYPE INTERNET ACCESS NETWORK AND SUBSCRIBER LINE ACCOMMODATION METHOD FOR USE IN THE SAME NETWORK

BACKGROUND OF THE INVENTION

1. Field of the Invention

The present invention relates to a LAN (Local Area Network) type internet access network and a subscriber line accommodation method for use in the same network.

2. Description of Related Art

In a conventional LAN type internet access network, a subscriber line accommodation method such as shown in FIG. 8 is used. As shown in FIG. 8, the conventional LAN type internet access network is constructed with L2 (Layer 2) switch 11 accommodating subscriber lines, DHCP (Dynamic Host Configuration Protocol) server 12 and service/management device 13 connected to an internet.

DHCP server 12 uses a MAC (Media Access Control) address of a user terminal (not shown) connected to a subscriber line as a key to assign an IP (Internet Protocol) address to the user terminal when the IP address is already assigned to the user terminal or to assign a new IP address to the user terminal and return the new IP address thereto when an IP address is not assigned to the user terminal. First, a user terminal, after the user terminal is connected to a subscriber line, transmits a DHCP request to receive an assignment of IP address. The DHCP request is transmitted by broadcast.

In general, any node in a LAN, which performs an IP communication with another node within the same LAN, acquires a MAC address of the associated another node by using an IP address of the associated node as a key and assembles a transmission packet on the basis of the MAC address. In this case, an ARP (Address Resolution Protocol) is a protocol for inquiring the MAC address corresponding to the IP address and the ARP request is transmitted by broadcast.

The L2 switch shown in FIG. 8 accommodates a plurality of subscriber lines and is connected to an upper side of the internet, which includes service/management device 13, to exchange data packets. Service/management device 13 includes a group of such devices as a default gateway for IP connection to the internet and a server or a router for providing various IP services including a WWW (World Wide Web) service to user terminals.

However, when the broadcast is inhibited by the L2 switch in the subscriber line accommodation method for the conventional LAN type internet access network, which is mentioned above, a transmission of the ARP request between user terminals in the subscriber lines becomes impossible. Therefore, there is a problem that IP communication between user terminals accommodated in the subscriber line is impossible.

Further, when the broadcast is allowed by the L2 switch in the conventional subscriber line accommodation method, the DHCP request and ARP request are transmitted to user terminals by broadcast. Therefore, there is another problem that it is impossible to systematically prohibit unintentional common possession of resources by user terminals or to prevent leakage of a MAC address of a user terminal accommodated in a subscriber line to a third party accommodated in another subscriber line in the same system.

SUMMARY OF THE INVENTION

In order to solve the above mentioned problems, an object of the present invention is to provide a LAN type internet access network capable of providing a receivability of IP communication between it and user terminals accommodated in subscriber lines as well as between user terminals and restricting the unintentional common possession of resources by user terminals and the leakage of MAC address of user terminals. Another object of the present invention is to provide and a subscriber line accommodation method for use in the LAN type internet access network.

A LAN type internet access network according to the present invention, in which a DHCP request for requesting an assignment of an IP address and an ARP request for inquiring a MAC address corresponding to the IP address are transmitted by broadcast, is featured by comprising means for limiting a transmission of the DHCP request and the ARP request to a subscriber line side.

A subscriber line accommodation method for use in a LAN type internet access network in which a DHCP request for requesting an assignment of an IP address and an ARP request for inquiring a MAC address corresponding to the IP address are transmitted by broadcast, according to the present invention, is featured by comprising the step of limiting a transmission of the DHCP request and the ARP request to a subscriber line side.

That is, in order to prevent unintentional information leakage between user terminals due to leakage of communication traffic and information outflow between user terminals, which becomes an occasion of various network attacks, the LAN type internet access network of the present invention is featured by preventing leakage of undesired communication and network information between user terminals while maintaining receivability of necessary IP on the user terminal side.

In the conventional technology, the DHCP server assigns an IP address to a user terminal connected to a subscriber line when the IP address is already assigned to the user terminal or a new IP address thereto when any IP address is not assigned to the user terminal, by using a MAC address of the user terminal as a key and return the IP address to the user terminal. After the user terminal is connected to a subscriber line, the user terminal transmits a DHCP request to receive an assignment of IP address. The DHCP request is transmitted by broadcast.

In general, any node, which performs an IP communication with another node within a LAN, acquires a MAC address of the associated another node by using an IP address of the associated node as a key and assembles a transmission packet on the basis of the MAC address. In this case, ARP is a protocol for inquiring MAC address corresponding to the IP address and the ARP request is transmitted by broadcast.

The L2 switch in the conventional technology accommodates a plurality of subscriber lines and is connected to an upper side of the internet, which includes the service/management device, to exchange data packets between them. In addition to the same operation as that mentioned above, the L2 switch used in the present invention transfers broadcast DHCP and ARP packets among data packets to be exchanged to only the upper side of the internet. That is, the DHCP and ARP broadcast packets are not transferred to the subscriber line side.

An L2 packet transfer device according to the present invention is connected to the L2 switch, an IP address managing device, a service/management device and a packet transfer device and transfers packet of the second layer (Ethernet (registered trademark)) toward a destination as it is without any modification thereof. When the L2 packet transfer device transfers the broadcast packet of the ARP request to the IP address managing device, it determines whether the ARP request is transmitted from a user terminal connected to a subscriber line or from the service/management device or the packet transfer device.

The IP address managing device of the present invention responds to the DHCP request transmitted from a user terminal through a subscriber line in the same manner as that of a usual DHCP server and stores a correspondence between MAC address and IP address for each user terminal in a DHCP management table.

The IP address managing device investigates the ARP request transferred by the packet transfer device as being transmitted from the service/management device or the packet transfer device on the DHCP management table and, when there is a corresponding entry in the DHCP management table, operates as a usual ARP proxy server transmitting a MAC address recorded in the entry in response to the ARP request.

Further, the IP address managing device searches the internal DHCP managing table for the ARP request transferred by the packet transfer device as being transmitted from a user terminal and, when there is a corresponding entry therein, the IP address managing device operates as a quasi ARP proxy server for transmitting a MAC address of a node corresponding to the IP address to the user terminal as a response to the ARP request.

The service/management device includes, in addition to a default gateway for IP connection to the internet, a group of devices constructed with servers and routers for providing various IP services including WWW services to user terminals. The packet transfer device is a usual router or server, which has a transfer function of IP packet.

In the conventional technology, a transfer of the ARP request from a user terminal to another user terminal, which are connected to respective subscriber lines, can not be done if the broadcast is prohibited by the L2 switch. Therefore, it is impossible to perform IP communication therebetween. On the other hand, if the broadcast is allowed by the L2 switch, the DHCP and ARP requests can be exchanged between the user terminals. Therefore, a MAC address of a user terminal may be unintentionally gotten by another user terminal and an unintentional common possession of resources between user terminals may occur.

In the present invention, the L2 switch limits the transfer of the broadcast packets of the DHCP request and the ARP request from user terminals in order that the broadcast packets are not transferred to other user terminal and the IP address managing device stands proxy for the ARP request from the service/management device to a user terminal and transmits a MAC address of the packet transfer device for the ARP request from one user terminal to another user terminal through the packet transfer device so that a MAC address of the another user terminal does not open to the one user terminal while realizing the IP receivability. Therefore, it is possible to prevent a user from acquiring MAC addresses of other user terminals by tapping DHCP communication and ARP communication and to prevent the user terminals from unintentionally possessing common resources, while maintaining IP communication between user terminals.

BRIEF DESCRIPTION OF THE DRAWINGS

Specific embodiments of the present invention will now be described, by way of example only, with reference to the accompanying of drawings in which.

DETAILED DESCRIPTION OF THE PREFERRED EMBODIMENTS

Figure 1:
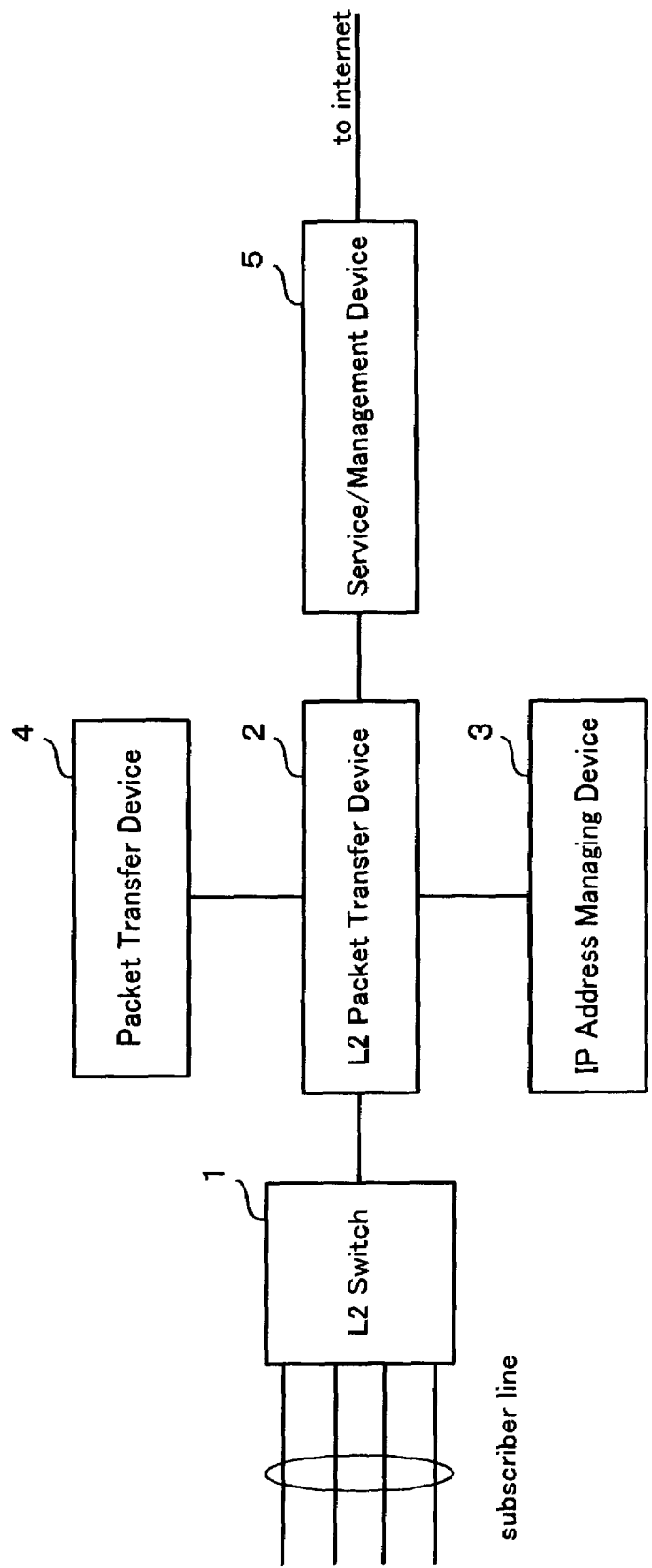
FIG. 1 is a block diagram showing a construction of a LAN type internet access network according to an embodiment of the present invention.

In FIG. 1, a LAN type internet access network according to an embodiment of the present invention is constructed with L2 (Layer 2) switch 1, L2 packet transfer device 2, IP address managing device 3, packet transfer device 4 and service/management device 5.

L2 switch 1 accommodates a plurality of subscriber lines and is connected to an upper side of an internet including service/management device 5 to exchange data packets between user terminals connected to the subscriber lines and the upper side. L2 switch 1 transfers DHCP and ARP broadcast packets among the exchanged data packets to only the upper side of the internet. That is, the L2 switch does not transmit these data packets to the subscriber line side.

L2 packet transfer device 2 mutually connects L2 switch 1, IP address managing device 3, service/management device 5 and packet transfer device 4 and transfers packets of the second layer (Ethernet) to a destination without modifying the packets. When L2 packet transfer device 2 transfers the broadcast packet of ARP request to IP address managing device 3, L2 packet transfer device 2 determines whether the ARP request is transmitted from a user terminal (not shown) connected to a subscriber line or from service/management device 5 or packet transfer device 4.

IP address managing device 3 performs a response to the DHCP request from a user terminal through a subscriber line in the same manner as that performed by a usual DHCP server and stores in a DHCP managing table (not shown) a correspondence between MAC addresses and IP addresses of the respective user terminals in a DHCP managing table (not shown).

Further, IP address managing device 3 searches the DHCP managing table for the ARP request transferred from packet transfer device 4 as being transmitted from service/management device 5 or packet transfer device 4 and, when there is an entry corresponding thereto in the table, operates as a usual ARP proxy server for transmitting a MAC address recorded in the entry.

Further, IP address managing device 3 searches the internal DHCP managing table for the ARP request transferred from packet transfer device 4 as being transmitted from the user terminal and, when there is an entry corresponding thereto in the table, operates as a quasi ARP proxy server for transmitting a MAC address of packet transfer device 4 as a MAC address of a node corresponding to the requested IP address.

Service/management device 5 includes a default gateway for IP connection to the internet and a group of devices, which are constructed with servers and routers, for providing various IP services including WWW services to user terminals. Packet transfer device 4 is a usual router or server, which has a transfer function of IP packets.

Figure 8:
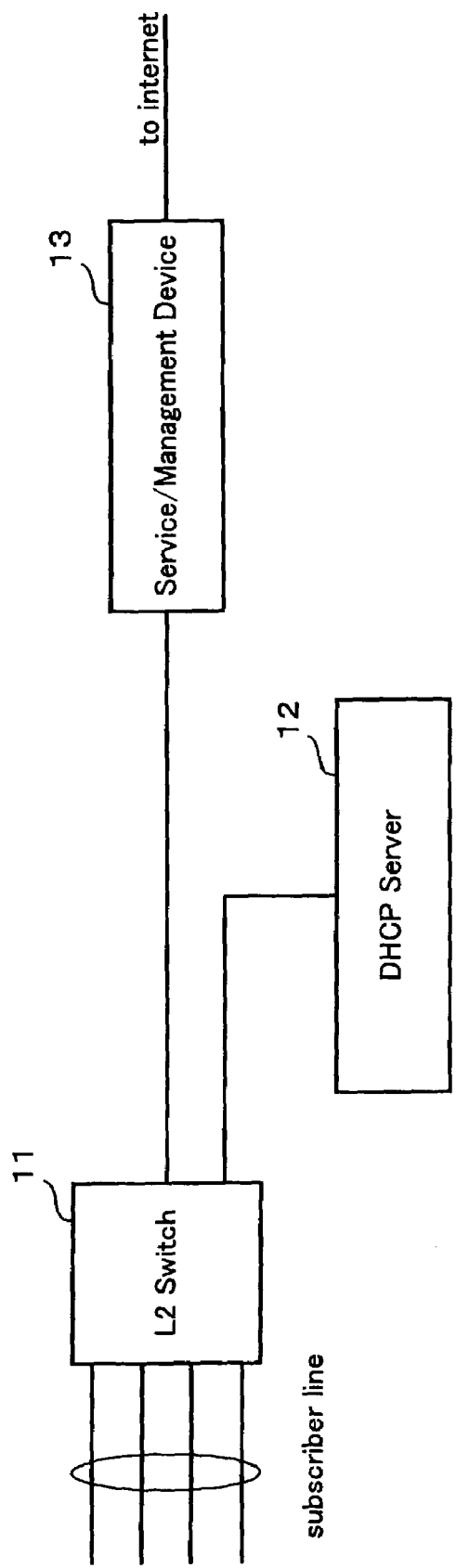
FIG. 8 is a block diagram illustrating a subscriber line accommodation method in a conventional LAN type internet access network.

In the conventional method shown in FIG. 8, the ARP request between user terminals connected to the subscriber line can not be transmitted if the broadcasting is prohibited by the L2 switch. Therefore, it is impossible to perform IP communication. On the other hand, if the broadcasting is allowed by the L2 switch, the DHCP request and ARP request are exchanged between the user terminals and, therefore, one user terminal may unintentionally get a MAC address of other user terminal and unintentional possession of resources in common between user terminals may occur.

In the embodiment of the present invention, L2 switch 1 limits the transfer of the broadcast DHCP and ARP requests from a user terminals so that the broadcast packets are not transferred to other user terminals and IP address managing device 3 stands proxy for the ARP request from service/management device 5 to the user terminal and transmits a MAC address of packet transfer device 4 from one user terminal to another user terminal through packet transfer device 4 so that a MAC address of the another user terminal does not become open to the one user terminal while realizing the IP receivability.

Therefore, it is possible to prevent a user from acquiring MAC address of another user terminal by tapping DHCP communication and ARP communication and prevent user terminals from unintentionally possessing resources in common, while maintaining the normal IP communication between user terminals.

Figure 2:
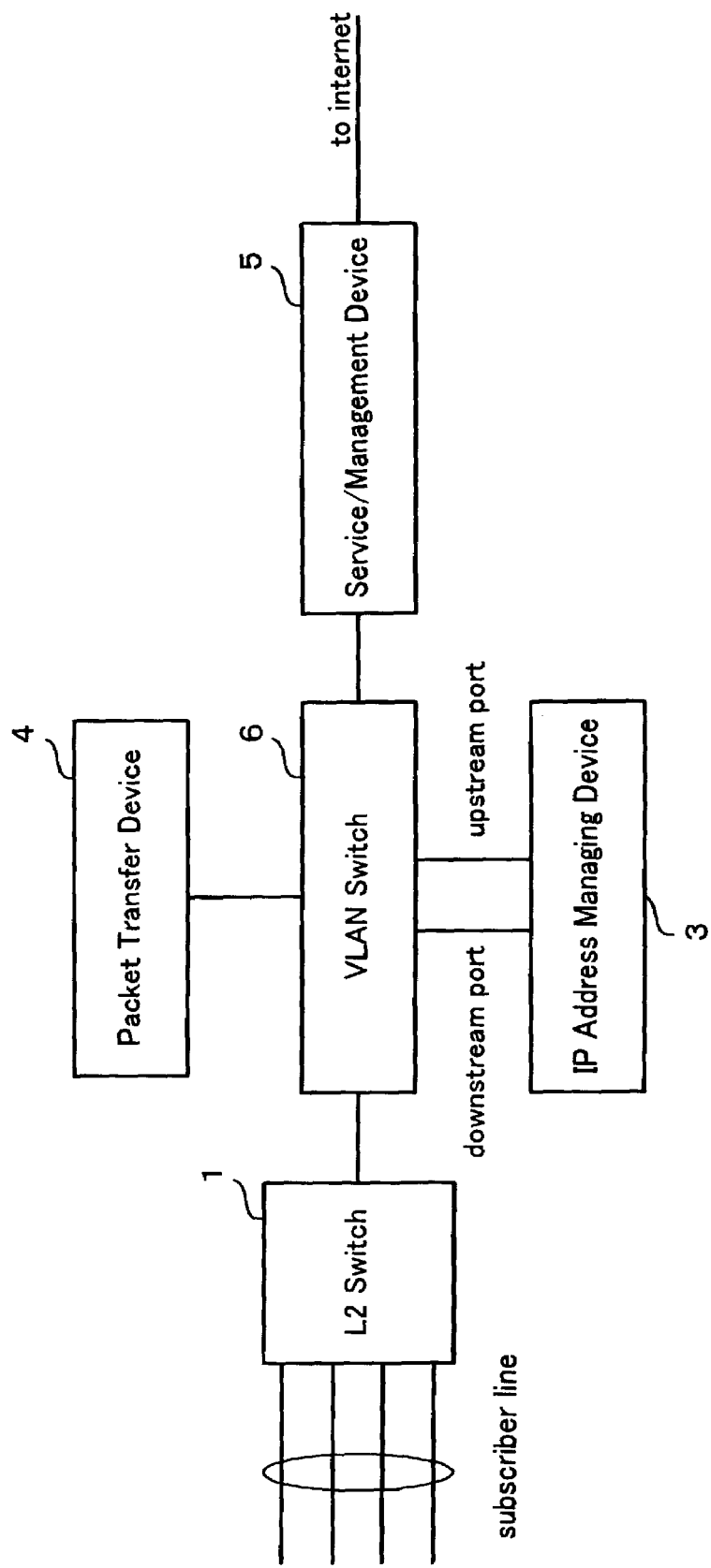
FIG. 2 is a block diagram showing a construction of a LAN type internet access network according to another embodiment of the present invention.

FIG. 2 is a block diagram showing a LAN type internet access network according to another embodiment of the present invention. As shown in FIG. 2, the LAN type internet access network is constructed with L2 switch 1, IP address managing device 3, packet transfer device 4, service/management device 5 and VLAN (Virtual Local Area Network) switch 6.

The embodiment shown in FIG. 2 takes in the form of a "logical subscriber line separator" in the LAN type internet access network. Further, in FIG. 2, the subscriber line is a communication medium realized by using a LAN cable, an xDSL (x Digital Subscriber Line) or an optical fiber, etc., and connects a user terminal (not shown) to L2 switch 1.

L2 switch 1 is the second layer (data link layer) switch operating in the same manner as that of L2 switch 1 shown in FIG. 1. In FIG. 2, L2 switch 1 accommodates a plurality of subscriber lines and is connected to an upper side of an internet including service/management device 5 to exchange data packets between user terminals and the upper side of the internet. L2 switch 1 transfers broadcast packets of DHCP and ARP among the exchanged data packets to only the upper side of the internet. That is, L2 switch does not transmit these data packets to the subscriber line side.

VLAN switch 6 is the second layer (data link layer) switch having a virtual LAN (VLAN) function and is defined by setting L2 switch 1 and a downstream port of IP address managing device 3 in one VLAN, L2 switch 1, packet transfer device 4 and service/management device 5 in another VLAN and packet transfer device 4, service/management device 5 and an upstream of IP address managing device 3 in a further VLAN. By this setting, the ARP request transmitted from packet transfer device 4 or service/management device 5 is transferred to IP address managing device 3 through the upper port of IP address managing device 3 and the ARP request transmitted from a user terminal and reached through the subscriber line and L2 switch 1 is transferred to IP address managing device 3 through the downstream port of IP address managing device 3.

Figure 3:
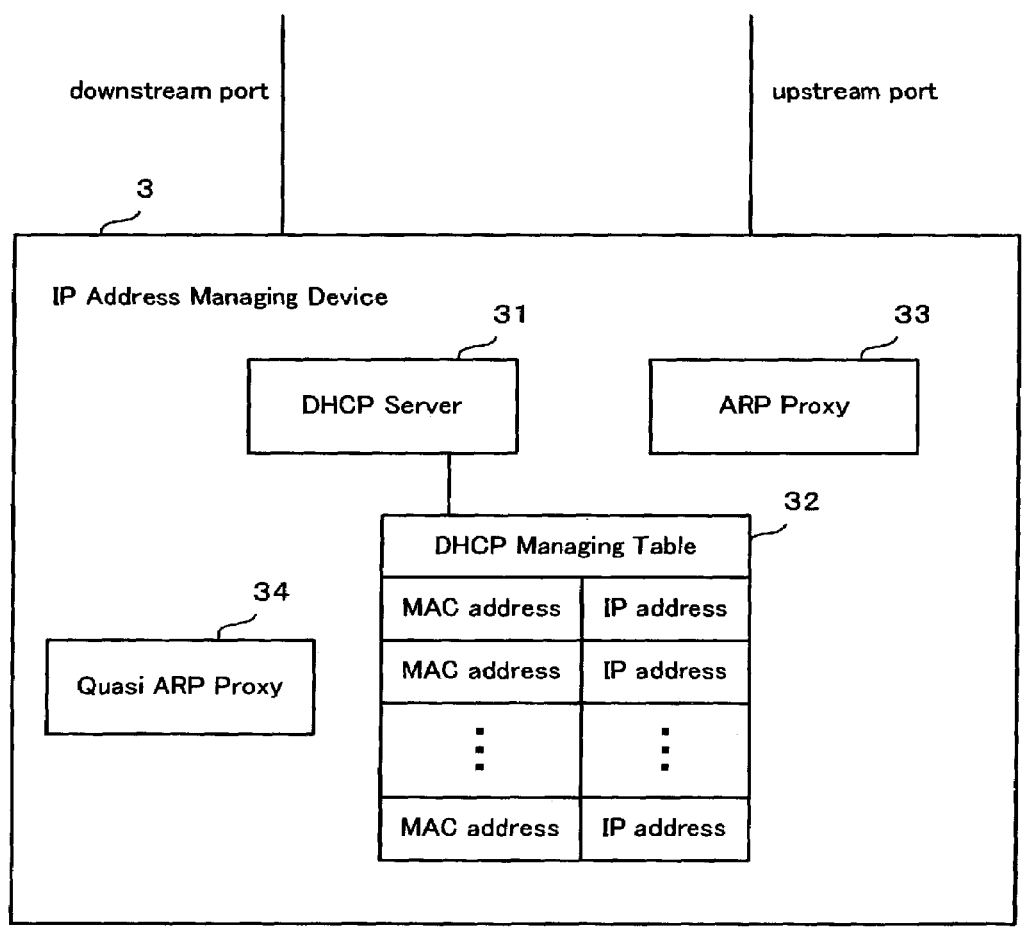
FIG. 3 is a block diagram showing a construction of an IP address managing device shown in FIG. 2.

FIG. 3 is a block diagram showing IP address managing device 3 shown in FIG. 2. In FIG. 3, IP address managing device 3 is constructed with DHCP server 31, DHCP managing table 32, ARP proxy server 33 and quasi ARP server 34.

IP address managing device 3 receives at its downstream port the DHCP request transmitted from a user terminal through a subscriber line. In response to the DHCP request, IP address managing device 3 assigns an IP address thereto, stores it in internal DHCP managing table 32 and notifies the user terminal of the assigned IP address according to the DHCP protocol.

Further, IP address managing device 3 receives at its downstream port an ARP request transmitted from a user terminal through the subscriber line, L2 switch 1 and VLAN switch 6. In response to the ARP request, IP address managing device 3 operates as quasi ARP proxy server 34. Quasi ARP proxy server 34 searches internal DHCP managing table 32 for the ARP request and, when there is an entry corresponding thereto, provides a MAC address of a LAN interface of packet transfer device 4 as a MAC address of a node corresponding to the requested IP address.

Further, IP address managing device 3 receives at its upstream port an ARP request transmitted from service/management device 5 or packet transfer device 4 through VLAN switch 6. In response to this ARP request, IP address managing device 3 operates as usual ARP proxy server 33. ARP proxy server 33 searches internal DHCP managing table 32 for the ARP request and, when there is an entry corresponding thereto, provides a MAC address recorded in the same entry.

Service/management device 5 includes a default gateway for IP connection to the internet and a group of devices such as servers and routers for providing various services on IP including WWW service, etc., to the user terminals.

Packet transfer device 4 is a usual router or server having a function of transferring IP packets in the IP layer. Since the IP packet is transferred in the IP layer, the MAC address, which is an information of the second layer (data link layer) of the packet, is rewritten. Since the IP packet transfer function of packet transfer device 4 in the IP layer is a standard function of each service/management device 5, the function of packet transfer device 4 may be realized by using one of service/management devices 5 without providing packet transfer device 4 as a separate device.

Incidentally, it may be possible to realize VLAN switch 6 and L2 switch 1 as a single device or to realize VLAN switch 6, L2 switch 1, IP address managing device 3 and packet transfer device 4 as a single device.

FIG. 4 to FIG. 7 are sequence charts showing an operation of the LAN type internet access network according to the present invention. The operation of the LAN type internet access network will be described with reference to FIG. 2 to FIG. 7.

After a user terminal is connected to a subscriber line, the user terminal transmits a DHCP request as a broadcast packet. The broadcast packet reaches not other user terminals but the downstream port of IP address managing device 3 through L2 switch 1 and VLAN switch 6 (a1 to a3 in FIG. 4).

Figure 4:
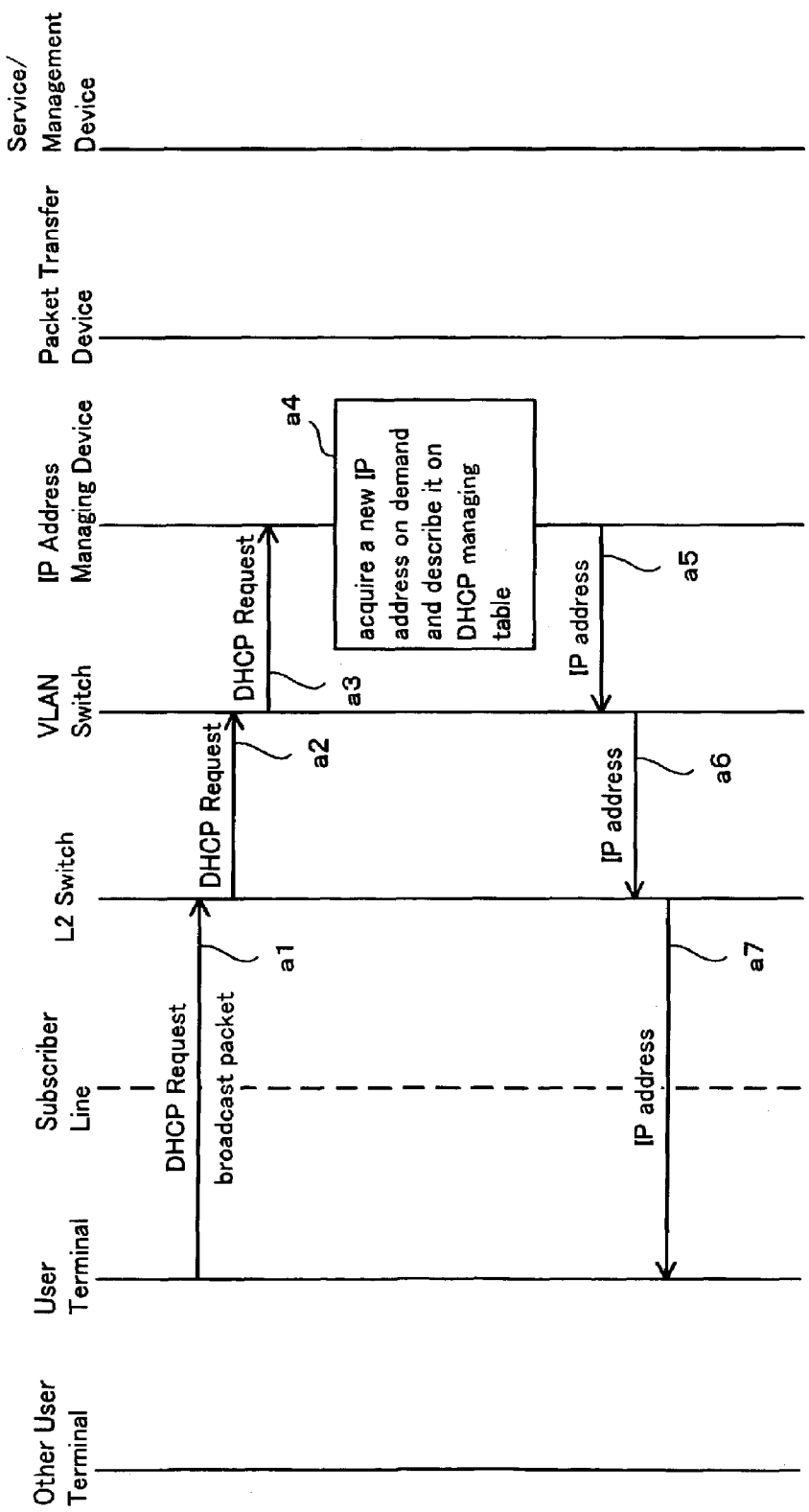
FIG. 4 is a sequence chart showing an operation of a LAN type internet access network according to another embodiment of the present invention.

DHCP server 31 of IP address managing device 3 operates in the same manner as that of the usual DHCP server to acquire a new IP address on demand, write it on DHCP managing table 32 (a4 in FIG. 4) and transmit the IP address to the user terminal from which the request is transmitted (a5 to a7 in FIG. 4).

When a user terminal transmits an IP packet to service/management device 5 whose MAC address is unknown, the user terminal tries to acquire the MAC address corresponding to the IP address of the destination of the IP packet by transmitting an ARP request to service/management device 5. This ARP request reaches only service/management device 5 through L2 switch 1 and VLAN switch 6 (b1 to b3 in FIG. 5).

Figure 5:
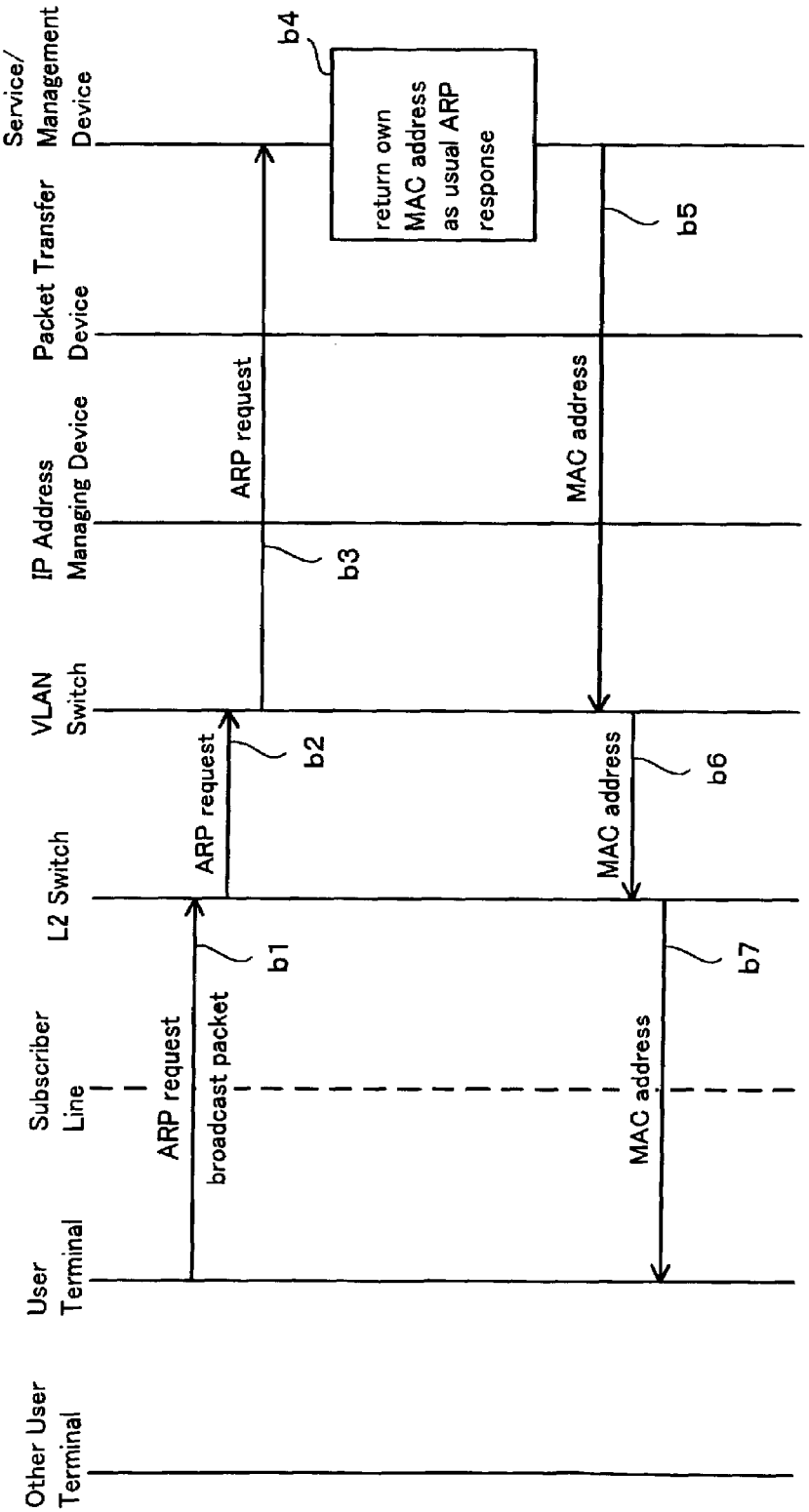
FIG. 5 is a sequence chart showing an operation of a LAN type internet access network according to another embodiment of the present invention.
Figure 6:
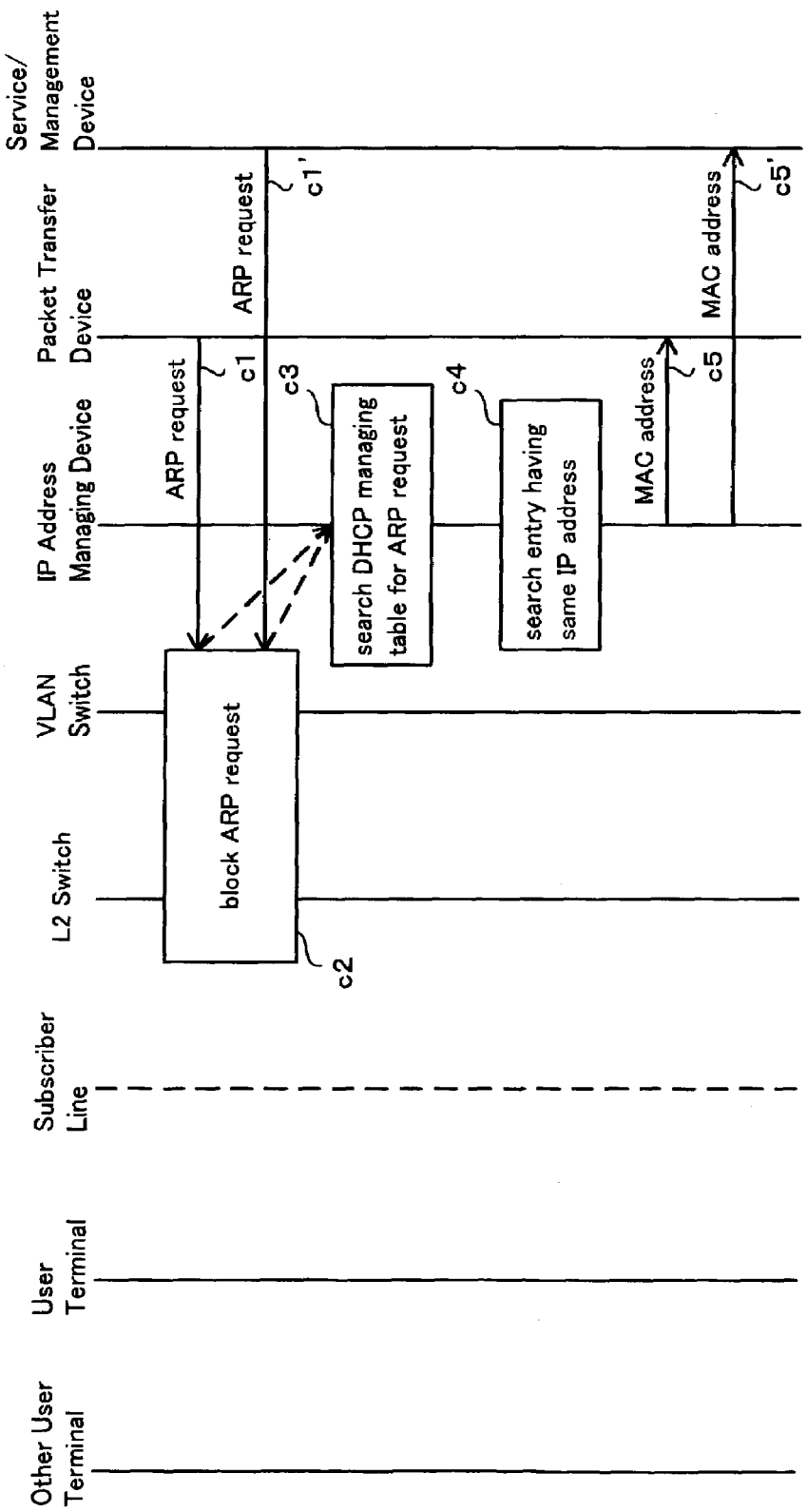
FIG. 6 is a sequence chart showing an operation of a LAN type internet access network according to another embodiment of the present invention.

In response to the ARP request from the user terminal, service/management device 5 sends its own MAC address to the user terminal, which transmits the ARP request (b4 to b7 in FIG. 5). Incidentally, in this case, the ARP request also reaches the downstream port of IP address managing device 3. However, since the corresponding IP address does not exist in DHCP management table 32, IP address managing device 3 does not send any response thereto.

Further, when a user terminal performs an IP communication with a node on a general internet, an IP subnet address is different from the IP address of the user terminal. Therefore, the packet transmission to service/management device 5 is performed in order to transfer a packet to a node of service/management device 5, which is preliminarily assigned as a default gateway.

In a case where service/management device 5 or packet transfer device 4 transmits an IP packet to a user terminal, the ARP request (c1 and c1' in FIG. 6) transmitted when the MAC address of service/management device 5 or packet transfer device 4 is unknown is blocked by L2 switch 1 or VLAN switch 6 (c2 in FIG. 6), so that it does not reach the user terminal.

The same ARP request reaches the upstream port of IP address managing device 3 through VLAN switch 6. In response to the ARP request, ARP proxy server 33 of IP address managing device 3 searches DHCP managing table 32 for the ARP request arrived at the upstream port (c3 in FIG. 6) to search an entry having an identical IP address (c4 in FIG. 6) and transmits a corresponding MAC address described in the entry to service/management device 5 or packet transfer device 4 (c5 and c5' in FIG. 6).

Incidentally, when the IP address requested by the ARP request is a broadcast address, a plurality of entries become identical. Therefore, ARP proxy server 33 transmits a plurality of ARP responses correspondingly thereto.

Figure 7:
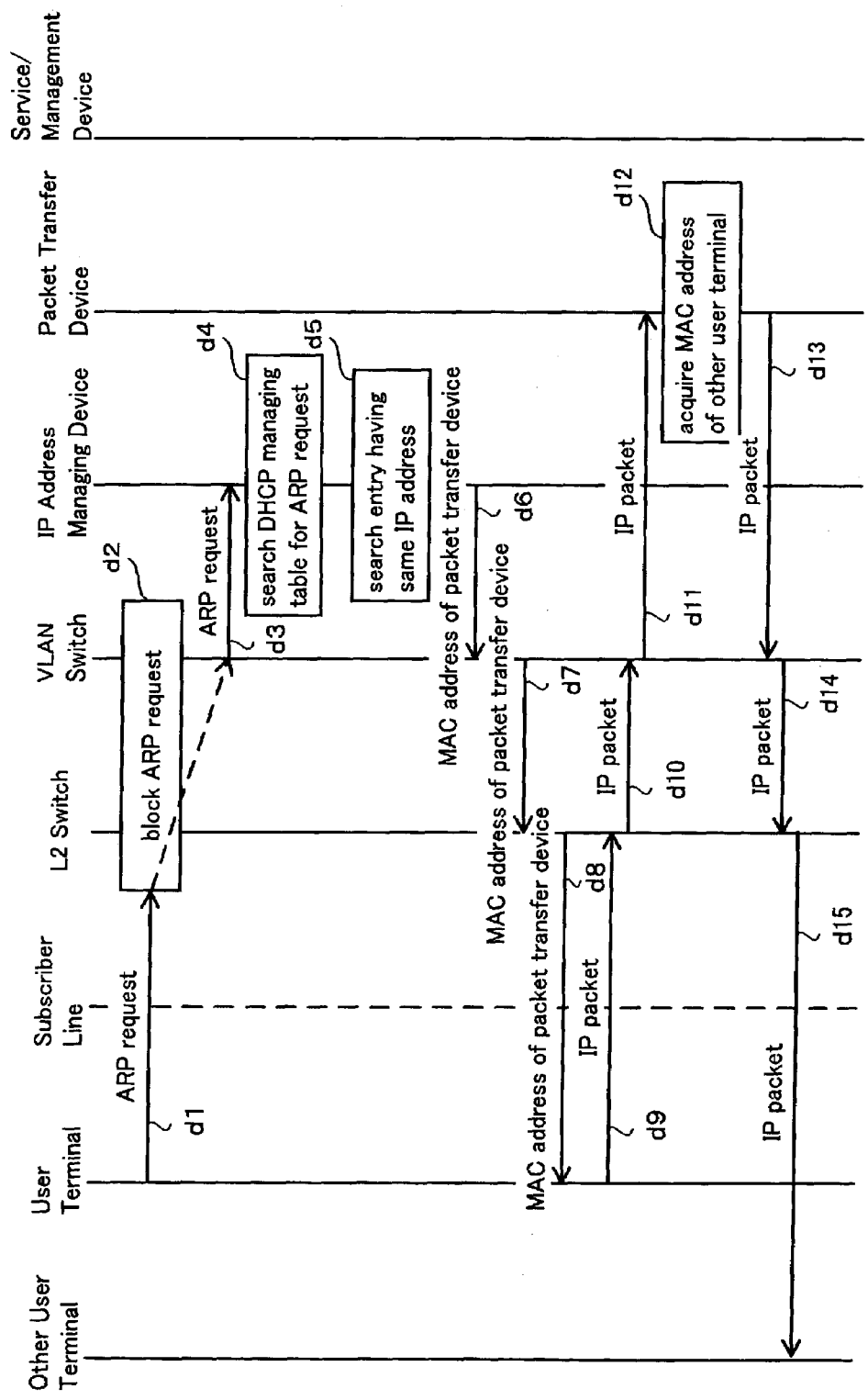
FIG. 7 is a sequence chart showing an operation of a LAN type internet access network according to another embodiment of the present invention.

In a case where a user terminal transmits an IP packet to another user terminal, an ARP request transmitted when a MAC address of the another user terminal is unknown (d1 in FIG. 7), is blocked by L2 switch 1 or VLAN switch 6 (d2 in FIG. 7) and reaches not the another user terminal but the downstream port of IP address managing device 3 (d3 in FIG. 7).

In response to the ARP request arrived at the downstream port of IP address managing device 3, quasi ARP proxy server 34 of IP address managing device 3 searches DHCP managing table 32 (d4 in FIG. 7) for an entry having identical IP address (d5 in FIG. 7) and, when the entry is found, transmits the MAC address of packet transfer device 4 corresponding to the IP address (d6 to d8 in FIG. 7).

In this case, when the IP address requested by the ARP request is a broadcast address, a plurality of entries become identical. Therefore, quasi ARP proxy server 34 transmits a plurality of ARP responses correspondingly thereto.

The user terminal, which receives this ARP response, transmits an IP packet to packet transfer device 4 (d9 to d11 in FIG. 7). Packet transfer device 4 acquires a MAC address of the user terminal, which is a real destination, according to the described manner (d12 in FIG. 7), so that the packet can be received by the another user terminal (d13 to d15 in FIG. 7).

In this embodiment, broadcast of DHC and ARP is limited by L2 switch 1 or VLAN switch 6 such that the broadcasts do not reach other user terminals as described previously. Therefore, it is possible to make a user terminal impossible to acquire a MAC address of another user terminal within the same system and to make the another user terminal impossible to access resources of an unintentionally set user terminal.

In this embodiment, in a case where an IP communication is performed between user terminals connected to the subscriber lines, the packets are exchanged through packet transfer device 4 with notifying the user terminal of the MAC address of only packet transfer device 4 while realizing the receivability of IP communication between user terminals. Therefore, it is impossible for a user terminal to acquire a MAC address of another user terminal in the same system by using DHCP protocol or ARP protocol.

Incidentally, since described DHCP server 31 itself is well known by those skilled in the art and has no direct relation to the present invention, a detailed description of the construction thereof is omitted. Further, the concept of ARP proxy server 33 is also well known by those skilled in the art. Further, since quasi ARP proxy server 34 is a modification of the well known concept of ARP proxy server 33, the detailed description is also omitted.

As described hereinbefore, according to the present invention, the LAN type internet access network in which the DHCP request for requesting the address assignment of an IP address and the ARP request for requesting a MAC address corresponding to the IP address are transmitted by broadcast can provide the IP receivability including between user terminals accommodated in subscriber line while restricting unintentional common use of resources and leakage of MAC addresses, by limiting transmission of the DHCP request and the ARP request to the side of user terminals.

What is claimed is:

1. A LAN (Local Area Network) internet access network, comprising:

switch means for accommodating a plurality of subscriber lines to which user terminals are connected and for exchanging data packets between the user terminals and the internet;

means for transmitting a DHCP (Dynamic Host Configuration Protocol) request from any of the user terminals for requesting the address assignment of an IP (Internet Protocol) address and an ARP (Address Resolution Protocol) request from that user terminal for requesting a MAC (Media Access Control) address corresponding to the IP address by broadcast, wherein said means for transmitting a DHCP request limits the DHCP request to a side of the network that excludes said subscriber lines, wherein said means for transmitting an ARP request limits the ARP request to said side of the network, wherein, when a user terminal transmits an IP packet to another user terminal, if a MAC address of the another user terminal is unknown, then an ARP request, which is transmitted from said user terminal to the switch means, is filtered by the switch means and reaches only to an IP address managing means, in which the IP address managing means searches a DHCP managing table for an entry having an identical IP address to an IP address requested by the ARP request and, wherein when the entry is found by said IP address managing means, the IP address managing means transmits a MAC address of a packet transfer means corresponding to the IP address requested by the ARP request to the user terminal, and the user terminal transmits the IP packet to the packet transfer means, such that the packet transfer means acquires a MAC address of the another user terminal that the user terminal needs to transmit IP packet to, and so that the IP packet can be received by the another user terminal.

2. A LAN internet access network as claimed in claim 1, further comprising:
   means for acquiring, in response to the DHCP request from said side of said subscriber line, an IP address in said side of said subscriber line; and
   means for transmitting said acquired IP address to said side of said subscriber line.

3. A LAN internet access network as claimed in claim 1, further comprising means for, when an IP (Internet Protocol) communication is performed between user terminals connected to said subscriber line, notifying said user terminals of the MAC address of a packet transfer device to perform said IP communication between said user terminals through said packet transfer device.

4. A LAN internet access network as claimed in claim 1, further comprising means for, when a transmission of said ARP request from an upper side of an internet to the side of said subscriber line is limited, notifying said internet upper side of said MAC address corresponding to said ARP request.

5. A LAN internet access network as claimed in claim 1, wherein said means for said transmission of the DHCP request and said means for said transmission of the ARP request comprise:
   an L2 (Layer 2) switch, as said switch means, connected to said subscriber line;
   an L2 packet transfer device, as said packet transferring means, connected to said L2 switch;
   an IP address managing device, as said address management means, connected to said L2 packet transfer device;
   an other packet transfer device connected to said L2 packet transfer device; and
   a service/management device connected to said L2 packet transfer device and to the internet, independent of said IP address management device.

6. A LAN internet access network as claimed in claim 1, wherein said means for said transmission of the DHCP request and said means for said transmission of the ARP request comprise:
   an L2 (Layer 2) switch, as said switch means, connected to said subscriber line;
   a virtual local area network (VLAN) switch, as said packet transferring means, connected to said L2 switch;
   an IP address managing device, as said address management means, connected to said VLAN switch;
   an other packet transfer device connected to said VLAN switch; and
   a service/management device connected to said VLAN switch and to the internet, independent of said IP address management device.

7. A LAN internet access network as claimed in claim 6, wherein said L2 switch and said VLAN switch are realized as a single device.

8. A LAN internet access network as claimed in claim 6, wherein said L2 switch, said VLAN switch, said IP address managing device, and said packet transfer device are realized as a single device.

9. A LAN internet access network as claimed in claim 1, wherein said IP address managing means stores in the DHCP managing table a correspondence between MAC addresses and IP addresses of respective user terminals in the DHCP managing table.

10. A LAN internet access network as claimed in claim 1, wherein said IP address managing means searches the DHCP managing table for the ARP request transferred from said packet transfer means as being transmitted from said means for service/management or said packet transfer means and, when there is an entry corresponding thereto in the table, operates as a usual ARP proxy server for transmitting a MAC address recorded in the entry.

11. A LAN internet access network as claimed in claim 1, wherein said IP address managing means searches the DHCP managing table for the ARP request transferred from said packet transfer means as being transmitted from the user terminals and, when there is an entry corresponding thereto in the table, operates as a quasi ARP proxy server for transmitting a MAC address of packet transfer means as a MAC address of a node corresponding to the IP address.

12. A LAN internet access network as claimed in claim 1, wherein said switch means transfers said DHCP request and said ARP request to only a side of the network that includes internet.

13. A subscriber line accommodating method for use in a LAN (Local Area Network) internet access network, in which a DHCP (Dynamic Host Configuration Protocol) request for requesting the address assignment of an IP (Internet Protocol) address and an ARP (Address Resolution Protocol) request for requesting a MAC (Media Access Control) address corresponding to the IP address are transmitted by broadcast, said subscriber line accommodating method comprising:
   limiting transmission of said DHCP request to a side of the network that excludes said subscriber line; and
   limiting transmission of said ARP request to said side of the network,
   wherein, when a user terminal transmits an IP packet to another user terminal, if a MAC address of the another user terminal is unknown, then an ARP request transmitted, which is transmitted from the user terminal to an switch, is filtered by the switch and reaches only to an IP address managing device, in which the IP address managing device searches a DHCP managing table for an entry having identical IP address to an IP address requested by the ARP request and,
   wherein when the entry is found by the IP address management device, the IP address managing device transmits a MAC address of packet transfer device corresponding to the IP address requested by the ARP request to the user terminal, and the user terminal transmits the IP packet to the packet transfer device, such that the packet transfer device acquires a MAC address of the another user terminal that a the user terminal needs to transmit IP packet to, and so that the IP packet can be received by the another user terminal.

14. A subscriber line accommodating method as claimed in claim 13, further comprising:
   acquiring, in response to the DHCP request from the side of said subscriber line, an IP address in said side of said subscriber line; and
   transmitting said acquired IP address to said side of said subscriber line.

15. A subscriber line accommodating method as claimed in claim 13, further comprising, when an IP (Internet Protocol) communication is performed between user terminals connected to said subscriber line, notifying said user terminals of the MAC address of a packet transfer device to perform said IP communication between said user terminals through said packet transfer device.

16. A subscriber line accommodating method as claimed in claim 13, further comprising, when a transmission of said ARP request from an upper side of an internet to the side of said subscriber line is limited, notifying said internet upper side of said MAC address corresponding to said ARP request.

17. A LAN (Local Area Network) internet access network, in which a DHCP (Dynamic Host Configuration Protocol) request for requesting the address assignment of an IP (Internet Protocol) address and an ARP (Address Resolution Protocol) request for requesting a MAC (Media Access Control) address corresponding to the IP address are transmitted by broadcast, said LAN internet access network comprising:

an L2 (Layer 2) switch connected to a subscriber line;
an L2 packet transfer device connected to said L2 switch;
an IP address managing device connected to said L2 packet transfer device;
an other packet transfer device connected to said L2 packet transfer device; and
a service/management device connected to said L2 packet transfer device and to the internet, independent of said IP address management device,
wherein said LAN internet access network limits transmission of the DHCP request to a side of the network that excludes said subscriber line,
wherein said LAN internet access network limits transmission of the ARP request to said side of the network,
wherein, when a user terminal transmits an IP packet to another user terminal, if a MAC address of the another user terminal is unknown, then an ARP request, which is transmitted from the user terminal to the L2 switch, is filtered by the L2 switch and reaches only to the IP address managing device, in which the IP address managing device searches a DHCP managing table for an entry having identical IP address to an IP address requested by the ARP request and,
wherein when the entry is found by the IP address managing device, the IP address managing device transmits a MAC address of the packet transfer device corresponding to the IP address requested by the ARP request to the user terminal, and the user terminal transmits the IP packet to the packet transfer device, such that the packet transfer device acquires a MAC address of the another user terminal that a the user terminal needs to transmit IP packet to, and so that the IP packet can be received by the another user terminal.

18. A LAN internet access network as claimed in claim 17, wherein said L2 packet transfer device comprises a virtual local area network (VLAN) switch.

19. A LAN internet access network as claimed in claim 18, wherein said L2 switch and said VLAN switch are realized as a single device.

20. A LAN internet access network as claimed in claim 19, wherein said L2 switch, said VLAN switch, said IP address managing device, and said packet transfer device are realized as a single device.

* * * * *